United States Patent [19]

Ichino

[11] Patent Number: 4,928,534
[45] Date of Patent: May 29, 1990

[54] SOCKET STRUCTURE FOR MOUNTING ULTRASONIC GAS FLOW MEASURING DEVICE WITH RESPECT TO GAS FLOW PIPE

[75] Inventor: Kouji Ichino, Tokyo, Japan

[73] Assignee: Kaijo Denki Co. Ltd., Japan

[21] Appl. No.: 295,990

[22] Filed: Jan. 12, 1989

Related U.S. Application Data

[63] Continuation of Ser. No. 687, Jul. 10, 1986, Pat. No. 4,823,612.

[51] Int. Cl.⁵ ............................................. G01F 1/66
[52] U.S. Cl. ............................ 73/861.18; 73/861.28
[58] Field of Search ................. 73/24, 861.18, 861.27, 73/861.28; 310/326, 327, 336, 341

[56] References Cited

U.S. PATENT DOCUMENTS

3,727,458 4/1973 Parkinson .................... 73/861.27
4,452,090 6/1984 Kou et al. .................... 73/861.28

FOREIGN PATENT DOCUMENTS

23817 2/1982 Japan ......................... 73/861.28

*Primary Examiner*—Charles A. Ruehl
*Attorney, Agent, or Firm*—Steinberg & Raskin

[57] ABSTRACT

A socket structure for mounting an ultrasonic gas flow measuring device with respect to a gas flow pipe which is capable of effectively preventing condensed moisture from being collected in a gap between a socket and a probe head received in the socket. The socket structure includes a pair of sockets each provided at a gas flow pipe to receive therein a probe head in such a manner that a gap may be defined between the socket and the probe head, and a moisture collection preventing construction provided at each of the sockets. The moisture collection preventing construction serves to prevent condensed moisture from being collected in the gap to form a bridge between the socket and the probe head and may be formed by a plurality of grooves formed on an inner surface of the socket which surrounds the probe head, thus allowing condensed moisture collected in the gap to escape therethrough to the gas flow pipe. Alternatively, it may be constructed by a gap which is defined to have a dimension sufficient enough to prevent condensed moisture from being collected therein to form a bridge between the socket and the probe head.

1 Claim, 4 Drawing Sheets

SOCKET STRUCTURE FOR MOUNTING ULTRASONIC GAS FLOW MEASURING DEVICE WITH RESPECT TO GAS FLOW PIPE

This is a continuation, of application Serial No. 000,687, filed 7/10/86, now Pat. No. 4,823,612.

BACKGROUND OF THE INVENTION

This invention relates to a socket structure for mounting an ultrasonic gas flow measuring device with respect to a gas flow pipe, and more particularly to a socket structure which is provided at a gas flow pipe for mounting, with respect to the pipe, a device for propagating ultrasonic waves through gas flowing via the pipe in order to measure the flow velocity and flow rate of the gas.

It is well-known in the art that when ultrasonic waves are propagated through gas flowing via a pipe, the propagation velocity of the ultrasonic waves vary depending upon the flow velocity of the gas. Such a principle has been utilized to develop an ultrasonic gas flow measuring device which is adapted to propagate ultrasonic waves through gas flowing via a pipe in order to measure the flow velocity of the gas, thereby reducedly calculating the flow rate of the gas.

Such an ultrasonic gas flow measuring device is typically constructed in such a manner as shown in FIG. 1. More particularly, a gas flow pipe 10 through which gas is flowed is provided with a pair of cylindrical sockets 12, which are arranged on the pipe 10 in such a manner as to be spaced from each other at an angle of 180 degrees in the circumferential direction of the pipe 10 and oblique at an angle of $\theta$ with respect to an axis of the pipe 10 so as to be linearly spaced at a predetermined distance 1, thereby being obliquely opposite to each other and fixed on the pipe 10 by a suitable means, such as welding or the like.

In each of the sockets 12 constructed as described above, a probe head 14, which is an ultrasonic transmit-receiving element acting as an ultrasonic transreceiver and fixedly mounted at one end thereof on a distal end of a terminal box 16, is securely received. Each of the probe heads 14 is inserted in the socket 12 in a manner to be aligned with an axis of the socket 12 and airtightly received therein. Also, each of the probe heads 14 is so positioned that one end thereof is aligned centrally with an inner surface of the pipe 10. Further, the probe heads 14, as described above, are arranged so as to be spaced at a predetermined distance 1 from each other. The ultrasonic gas flow measuring device also includes a signal supply cable 18 covered with a protection tube 20 and having one end connected through the terminal box 16 to the probe head 14 and the other end connected to a common controller 22.

The ultrasonic gas flow measuring device constructed as described above is operated in such a manner that the probe heads 14 alternately and repeatedly carry out the transmitting and receiving of an ultrasonic pulse signal controlled by the controller 22 through the distance 1 therebetween, so that the propagation time of the ultrasonic pulse signal propagated through gas flowing via the pipe 10 may be measured to determine the flow velocity and flow rate of the gas.

More particularly, during the alternate transmitting and receiving of ultrasonic waves between the probe heads 14, the propagation time of the ultrasonic waves through gas flowing via the pipe 10 when the direction of flow of the gas coincides with that of propagation of the ultrasonic waves is measured as $t_1$ and the propagation time of the ultrasonic waves when the direction of the gas flow is opposite to that of propagation of the ultrasonic wave is measured as $t_2$, and the so-measured propagation times $t_1$ and $t_2$ are respectively applied to the following equations (1) and (2):

$$t_1 = \frac{L}{C + V\cos\theta} \quad (1)$$

$$t_2 = \frac{L}{C - V\cos\theta} \quad (2)$$

The equations (1) and (2) are used for obtaining the following equation (3):

$$V = \frac{L}{2\cos\theta}\left(\frac{1}{t_1} - \frac{1}{t_2}\right) \quad (3)$$

wherein V = flow velocity (m/s),
L = distance between probe heads (m)
$\theta$ = angle of propagation axis of ultrasonic wave with respect to axis of pipe, and
C = propagation velocity.

Such an ultrasonic gas flow measuring device does not cause pressure loss of gas flowing via the pipe because it is free of any obstacle to the flowing of the gas. Also, it has another advantage in that it is substantially free of any movable mechanical parts. Further, it is capable of measuring the flow velocity and flow rate of gas over a wider angle with satisfactory reproducibility. Thus, this device has been extensively used in a variety of fields.

In the sockets which receive the probe heads of the ultrasonic gas flow measuring devices, an excessive gap between the socket and the probe causes gas flowing through the pipe to be disturbed, resulting in a measurement error. In order to avoid such a problem, such a gap g (FIG. 1) is generally determined to be as small as about 1.5 mm.

Nevertheless, the conventional socket has the following disadvantage. Gas flowing through the pipe 10, which generally contains much moisture or is in the form of a substantially saturated steam, is gradually decreased in temperature during the transfer through the pipe, so that the moisture may be gradually condensed on an inner surface of the pipe 10. The so-condensed moisture often adheres to or is collected at an entrance portion of the gap g between the socket and the probe head, as indicated by reference numeral 24 in FIG. 2. Alternatively, the condensed moisture enters into the probe head 14, for example, through the gap g. When the condensed moisture is interposed via the gap between the socket and the probe head to form a bridge therebetween, ultrasonic waves transmitted from one of the probe heads are propagated as shown in FIG. 3. More particularly, a part of the ultrasonic wave transmitted from one of the probe heads is propagated via a regular route to the opposite probe head as indicated by a solid line arrow X in FIG. 3, whereas the remainder of the ultrasonic wave is propagated through an irregular route, which includes the condensed water, and is indicated by a dotted arrow Y in FIG. 3. Generally, ultrasonic waves propagated through the irregular route have a propagation velocity as rapid as about 5000 m/sec, whereas those propagated through the regular route have a propagation velocity as slow as 340 m/sec. Thus, the former ultrasonic waves start to reach the other or opposite probe head in the form of a noise signal before the latter ones. This so-received noise signal makes accurate measurement of the flow velocity and flow rate of the gas impossible to carry out.

Accordingly, it would be highly desirable to provide an improved socket structure for mounting an ultrasonic gas flow measuring device with respect to a gas flow pipe.

SUMMARY OF THE INVENTION

Generally speaking, in accordance with the present invention, a socket structure for mounting an ultrasonic gas flow measuring device with respect to a gas flow pipe is provided. The socket structure includes a pair of sockets provided at the gas flow pipe for respectively receiving ultrasonic transmit-receiving elements of the ultrasonic gas flow measuring device therein and communicated to the gas flow pipe. The sockets are positioned in a manner to be obliquely opposite to each other. More particularly, the sockets are arranged in a manner to be spaced from each other at an angle of 180 degrees in the circumferential direction of the pipe and oblique with respect to an axis of the pipe. The socket structure also includes moisture collection preventing means for preventing condensed moisture in the gas from being collected between each of the sockets and the ultrasonic transmit-receive element to form a bridge therebetween sufficient to form such an irregular propagation route as described above.

Accordingly, it is an object of the present invention to provide a socket structure for mounting an ultrasonic gas flow measuring device with respect to a gas flow pipe which is capable of allowing the measuring device to accomplish the measurement of flow velocity and flow rate of gas flowing through the pipe with high precision.

It is another object of the present invention to provide a socket structure for mounting an ultrasonic gas flow measuring device with respect to a gas flow pipe which is capable of allowing the measuring device to carry out only normal propagation of ultrasonic waves transmitted from a probe head of the measuring device in order to ensure the accurate measurement of gas flow through the pipe.

It is another object of the present invention to provide a socket structure for mounting an ultrasonic gas flow measuring device with respect to a gas flow pipe which is capable of preventing the measuring device from generating any noise signal, thereby ensuring the accurate measurement of gas flow through the pipe.

It is a further object of the present invention to provide a socket structure for mounting an ultrasonic gas flow measuring device with respect to a gas flow pipe which is capable of effectively preventing both the malfunction of the device and a resultant failure in measurement of gas flow through the pipe.

It is still another object of the present invention to provide a socket structure for mounting an ultrasonic gas flow measuring device with respect to a gas flow pipe which is capable of preventing the formation of condensed moisture which causes abnormal propagation of ultrasonic waves transmitted from a probe head of the measuring device, thereby ensuring the accurate measurement of gas flow.

It is yet another object of the present invention to provide a socket structure for mounting an ultrasonic gas flow measuring device with respect to a gas flow pipe which is capable of preventing condensed moisture from being collected around the measuring device to such a degree as would sufficient enough to cause abnormal propagation of ultrasonic waves from a probe head of the measuring device, so that the flow velocity and flow rate of gas flowing through the pipe may be accurately measured.

It is still a further object of the present invention to provide a socket structure for mounting an ultrasonic gas flow measuring device with respect to a gas flow pipe which is capable of preventing the formation of condensed moisture causing abnormal propagation of ultrasonic wave, thereby ensuring the accurate measurement of gas flow through the pipe.

It is yet a further object of the present invention to provide a socket structure for mounting an ultrasonic gas flow measuring device with respect to a gas flow pipe which is capable of accomplishing the above-described objects with a simple structure.

Still other objects and advantages of the present invention will be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout, wherein.

DETAILED DESCRIPTION OF THE DRAWINGS

A socket structure for mounting an ultrasonic gas flow measuring device with respect to a gas flow pipe according to the present invention will be described with reference to the accompanying drawings.

Figure 4:
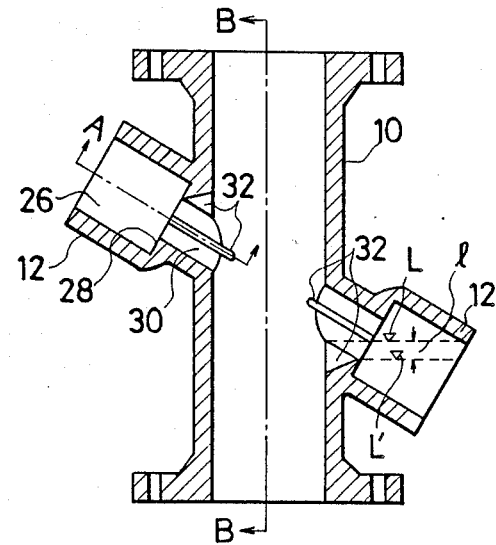
FIG. 4 is a plan view in section showing an embodiment of a socket structure for mounting an ultrasonic gas flow measuring device with respect to a gas flow pipe according to the present invention.
Figure 6:
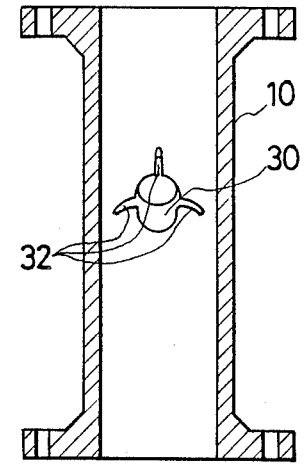
FIG. 6 is a sectional view taken along line B—B of FIG. 4.
Figure 5:
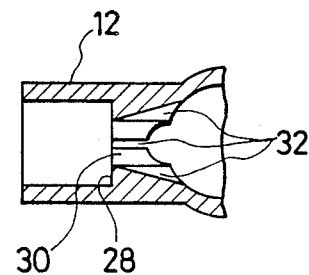
FIG. 5 is a sectional view taken along line A—A of FIG. 4.

FIGS. 4 to 6 illustrate an embodiment of a socket structure according to the present invention. A socket structure of the embodiment shown in FIG. 4 includes a pair of cylindrical sockets 12 provided at a gas flow pipe 10 in such a manner as the conventional socket described above. The sockets 12 are adapted to receive therein ultrasonic transmit-receiving elements or probe heads (not shown) of an ultrasonic gas flow measuring device with a suitable gap being defined therebetween. Also, the sockets 12 are formed so as to be communicated to the gas flow pipe 10. The sockets 12 are positioned obliquely opposite to each other. More particularly, the sockets 12 are arranged in a manner so as to be spaced at an angle of 180 degrees in the circumferential direction of the pipe and oblique with respect to an axis of the gas flow pipe 10. In the illustrated embodiment, the cylindrical sockets 12 are formed so as to have an outer cylindrical space 26 of a large diameter having an annular bottom 28 and an inner cylindrical space 30 communicated through the annular bottom 28 to the outer space 26 and adapted to receive the ultrasonic transmit-receiving element or probe head therein. The remainder of the socket may be constructed in substantially the same manner as the conventional socket described above.

The socket structure of the illustrated embodiment also includes moisture collection preventing means provided at each of the sockets for preventing moisture contained in gas flowing through the pipe from being condensed and collected between the socket and the ultrasonic transmit-receive element or probe head received therein to a degree sufficient enough to form a bridge therebetween.

In the illustrated embodiment, the moisture collection preventing means comprises a plurality of grooves 32 formed on an inner surface of the socket which surround the probe head or on an inner surface of the inner cylindrical space 30 in a manner to extend in the axial direction of the socket 12. The grooves 32 may be arranged so as to be spaced at predetermined or regular angular intervals from each other. In the illustrated embodiment, three such grooves 32 are formed in the socket 12. Also, the grooves 32 are arranged so as to be spaced from each other at angular intervals of about 120 degrees. However, the number of grooves 32 may be two or more than 4. The grooves 32 serve to allow condensed moisture collected in the gap between the inner surface of the socket 12 and the probe head to escape therethrough to the gas flow pipe 10. For this purpose, the grooves 32 are preferably formed in such a manner as to be gradually enlarged outwardly in the radial direction of the socket 12 toward the gas flow pipe 10 so that they may be gradually increased in depth toward the gas flow pipe 10, as shown in FIGS. 4 to 6. Such a construction of the grooves 32 causes condensed moisture to be collected in the socket 12 at a lowered level indicated at L' in FIG. 4, whereas when such grooves 32 are not provided in the socket 12, the level of condensed moisture is indicated at L in FIG. 4; so that a difference 1 in level occurs therebetween. In the illustrated embodiment, the grooves 32 are spacedly provided at three positions on the inner surface of the inner cylindrical space 30 at substantially equal or angular intervals of about 120 degrees, as described above. Such construction allows condensed moisture between the probe head and the socket to effectively escape through at least one of the slanting grooves 32 to the gas flow pipe 10, irrespective of the direction of the gas flow pipe.

Figure 7:
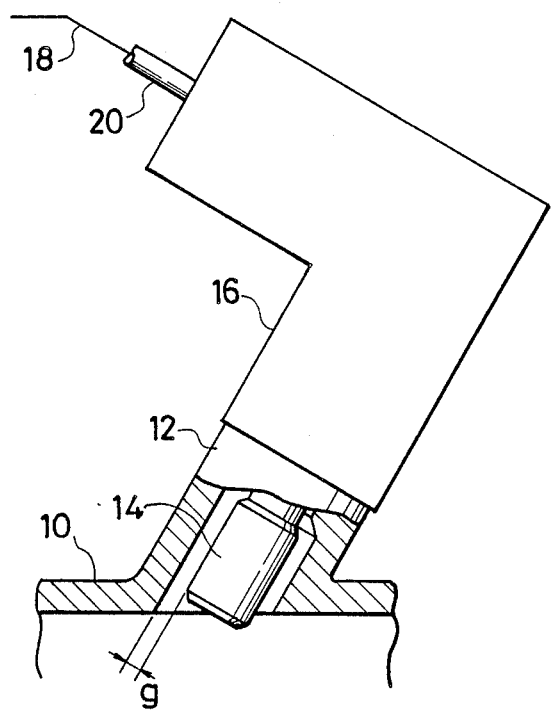
FIG. 7 is a side elevation view partly in section showing another embodiment of a socket structure according to the present invention.

FIG. 7 illustrates another embodiment of a socket structure according to the present invention. In a socket structure shown in FIG. 7, a moisture collection preventing means for each socket 12 comprises a gap g so defined between the socket 12 and a probe head 14 of an ultrasonic gas flow measuring device as to have a dimension sufficient to prevent condensed moisture from being collected in the gap to form a bridge between the socket 12 and the probe head 14. In practice, the gap g preferably has a dimension of about 5 mm or more.

It has been noted that such construction effectively prevents condensed moisture from forming a bridge between the socket and the probe head sufficient enough to form such an irregular propagation route as described above, so that the socket may ensure normal propagation of ultrasonic waves without abnormal propagation through condensed moisture.

Figure 1:
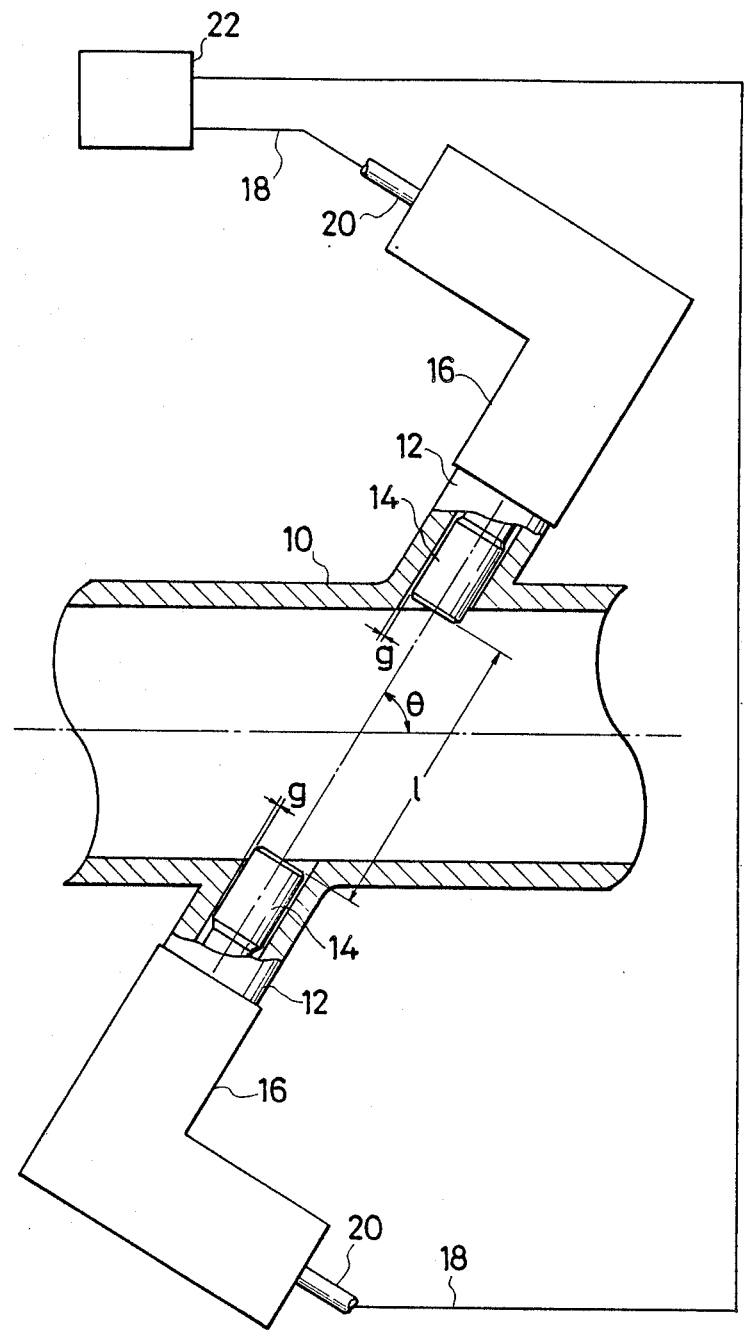
FIG. 1 is a schematic view partly in section illustrating a conventional ultrasonic gas flow measuring device.
Figure 2:
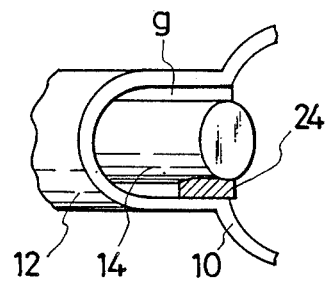
FIG. 2 is a schematic view of a probe head in the conventional ultrasonic gas flow measuring device of FIG. 1 which shows the formation of condensed moisture between the probe head and a socket.
Figure 3:
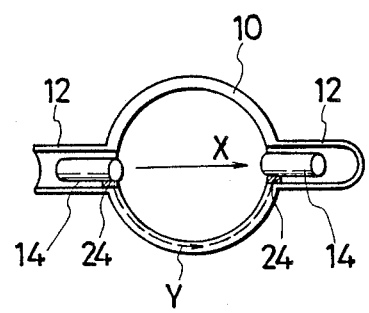
FIG. 3 is a schematic view showing the manner of propagation of ultrasonic wave in a conventional socket.

The remainder of the embodiment shown in FIG. 7 may be constructed in substantially the same manner as the conventional socket shown in FIG. 1.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A socket structure for mounting an ultrasonic gas flow measuring device with respect to a gas flow pipe, comprising:
    a pair of sockets provided at said pipe to respectively receive therein ultrasonic transmit-receive elements of said ultrasonic gas flow measuring device therein with a suitable gap being defined therebetween and communicated to said pipe, said sockets being arranged in a manner to be spaced from each other at an angle of 180 degrees in the circumferential direction of said pipe and oblique with respect to an axis of said pipe;
    a moisture collection preventing means provided at each of said sockets for preventing moisture contained in said gas from being condensed and collected between each of said sockets and said ultrasonic transmit-receive element received therein to a degree sufficient enough to form a bridge therebetween, said moisture collection preventing means comprising
    a gap defined between said socket and said ultrasonic transmit-receive element received in said socket, said gap having a dimension of about 5 mm or more, which is sufficient to prevent condensed moisture from being collected therein to form a bridge between said socket and said ultransonic transmit-receive element.

* * * * *